United States Patent [19]

Kumasaka et al.

[11] Patent Number: 5,247,415
[45] Date of Patent: Sep. 21, 1993

[54] MAGNETIC HEAD HAVING MAIN AND AUXILIARY MAGNETIC PATHS

[75] Inventors: Noriyuki Kumasaka, Ome; Takeo Yamashita, Tachikawa; Toshio Kobayashi, Tokyo; Ryoichi Nakatani, Akigawa; Shigekazu Otomo, Sayama, all of Japan

[73] Assignee: Hitachi, Ltd., Tokyo, Japan

[21] Appl. No.: 981,994

[22] Filed: Nov. 24, 1992

Related U.S. Application Data

[63] Continuation of Ser. No. 554,896, Jun. 28, 1990, abandoned.

[30] Foreign Application Priority Data

Jul. 7, 1989 [JP] Japan ................................ 1-174015

[51] Int. Cl.$^5$ ........................... G11B 5/23; G11B 5/31
[52] U.S. Cl. .................................... 360/126; 360/119; 360/125
[58] Field of Search ...................... 360/126, 125, 119

[56] References Cited

U.S. PATENT DOCUMENTS

| | | | |
|---|---|---|---|
| 2,928,079 | 3/1960 | McNutt | 360/126 |
| 3,255,307 | 6/1966 | Schuller | 360/126 |
| 3,365,709 | 1/1968 | Gooch | 360/126 |
| 4,868,698 | 9/1989 | Takahashi et al. | 360/126 |
| 4,897,748 | 1/1990 | Takahashi et al. | 360/126 |

FOREIGN PATENT DOCUMENTS 61-280009 12/1986 Japan.
1-113909 5/1989 Japan.

OTHER PUBLICATIONS

"Integrated Magnetic Recording Heads"; Lazzari et al, IEEE Transactions on Magnetics, vol. Mag. 7, No. 1, Mar. 1971; pp. 146-150.

Primary Examiner—Robert S. Tupper
Attorney, Agent, or Firm—Fay, Sharpe, Beall, Fagan, Minnich & McKee

[57] ABSTRACT

A magnetic head has a main magnetic path forming film forming an operation gap, and an auxiliary magnetic path forming film for complementing said main magnetic path forming film. The auxiliary magnetic path forming film is disposed behind the gap depth of said magnetic core and magnetically coupled to the main magnetic path forming film. The main magnetic path forming film has a direction of easy magnetization perpendicular to the direction of depth of the operation gap, while the auxiliary magnetic path forming film has a direction of easy magnetization which coincides with the direction in which said magnetic head opposes the recording medium.

34 Claims, 4 Drawing Sheets

MAGNETIC HEAD HAVING MAIN AND AUXILIARY MAGNETIC PATHS

This application is a continuation of application Ser. No. 07/544,896, filed Jun. 28, 1990, now abandoned.

BACKGROUND OF THE INVENTION

The present invention relates to a magnetic head for use in magnetic recording and reproducing of information in and from a magnetic recording medium.

In recent years, there is an increasing demand for higher recording density in magnetic recording. To cope with this demand, it is necessary to develop a magnetic recording medium having a greater coercive force, as well as a magnetic recording head having improved performance. For instance, a magnetic head is demanded which has a high level of saturation magnetic flux density and magnetic permeability, in order to fully utilize the merits of magnetic recording mediums having high coercive force. For this reason, conventionally used ferrite materials are being replaced by crystalline magnetic alloys such as Ni-Fe and Fe-Al-Si alloys and amorphous magnetic alloys such as Co-Nb-Zr or Co-Ta-Zr.

Track width and gap length of the magnetic head also are reduced as a result of an increase in the recording density, requiring a higher precision of machining. The transmission rate is also increased to improve the recording and reproducing characteristics at high frequency. These requirements are met by magnetic heads having multilayered structures. Under these circumstances, techniques for forming thin films such as sputtering, vacuum evaporation and plating, as well as processing technique such as a lithographic technique, are becoming popular and are used in place of conventional machining of bulk materials. Thin-film type magnetic heads produced by these techniques are becoming popular.

In order to make full use of the characteristics of the high frequency region, attempts are extensively made to control the magnetic anisotropy of magnetic films in the magnetic path of the magnetic head. It is known that the magnetic permeability of a magnetic film in a high-frequency region is low in the direction of easy magnetization and high in the direction of difficult magnetization. This is because the magnetization process in the direction of easy magnetization mainly relies upon the movement of magnetic domain walls, while the magnetization process in the direction of hard magnetization relies mainly upon rotation magnetization.

Two methods are available for imparting a magnetic anisotropy to a magnetic film:namely, to apply a magnetic field during forming of the magnetic film and to heat-treat the magnetic film in a magnetic field. By using such methods, it is possible to obtain a magnetic film in which the axes of easy magnetization are aligned in the same direction as the direction of the applied magnetic field. In the case of a thin film, however, it is difficult to set the axes of easy magnetization in the direction of thickness of the film. Usually, therefore, the axes of easy magnetization extend in the film. It is known that the performance of a magnetic head is improved when the magnetic anisotropy is imparted to the magnetic film in the direction of hard magnetization to provide the development of high magnetic permeability in the direction of the magnetic path.

This type of thin-film magnetic head is used for example, in magnetic disk devices for computers as disclosed, for example, in IEEE Transaction on Magnetics, MAG-7, 146, 1971.

FIGS. 14(a) and 14(b) show an example of the thin-film type magnetic head, in a sectional view and in a plan view, respectively. The magnetic head has a substrate 1, a lower magnetic film 2 formed on the substrate, an insulating film on the lower magnetic film 2, a coil 3 on the insulating film, and an upper magnetic film 4 on the coil 3, thus forming a magnetic path. Numeral 5 denotes a surface facing the recording medium, while 6 represents a track width. The magnetic path is formed such that the direction of hard magnetization coincides with the direction to the recording medium. Therefore, the direction 7 of easy magnetization coincides with the direction of the track width which extends in the film plane, whereby a high magnetic permeability is obtained in the direction of the magnetic path.

In general, however, ring-type magnetic heads such as those used in VTRs have complicated configurations, so that it is not easy to align the whole magnetic path in the direction of high magnetic permeability.

FIG. 15 shows a known ring-type magnetic head used in VTRs, as disclosed in INTER MAG CONFERENCE, April, 14–17, 1987.

This magnetic head has a protective substrate 1, a plurality of layers of magnetic film 2 and a protective substrate 1'. This multi-layerd structure is divided into core halves 8 and 8' and, after formation of a coil-winding window 9, these two parts are joined together through a gap material 10. In this case, the track width 6 is in the direction of thickness of the magnetic film. In this ring-type magnetic head, the magnetic path is formed so as to surround the coil window 9. When the principle of the thin-film magnetic head shown in FIG. 14 is applied to the ring-type magnetic head, it is understood that the magnetic anisotropy should be imparted to this ring-type magnetic head such that the direction of easy magnetization exists in the thicknesswise direction of the magnetic film, i.e., the direction of the track width which direction is perpendicular to the direction of the magnetic path. In the ring-type magnetic head shown in FIG. 15, however, it is difficult to set the direction of easy magnetization in the thicknesswise direction of the film, because of the influence on the demagnetizing field, especially when the film thickness is reduced to, for example, 10 μm or less for the purpose of enhancing the track density.

A similar effect can be obtained when axes of easy magnetization are provided in a radial direction with respect to a ring-type core. From a view point of mass-production, however, it is extremely difficult to control all of the axes of easy magnetization along and perpendicularly to the magnetic path.

In the magnetic circuit including the magnetic head, the characteristics of the magnetic head are largely influenced by the magnetic resistance occurring in a region which is in the vicinity of the operation gap adjacent the head face opposing the recording medium. It is understood that an appreciable improvement in the characteristics is attainable by aligning the direction of easy magnetization in the above-mentioned region with the direction of running of the magnetic recording medium. In this case, however, the portion of the magnetic path behind the above-mentioned region becomes parallel to the direction of easy magnetization so that satisfactory head chracteristics cannot be obtained. Further, the thickness of the magnetic film is reduced in the case of heads having small track widths of 10 μm or less. Therefore, in the magnetic head of the type shown in FIG. 15 having a comparatively large length of the magnetic path, the magnetic resistance of the magnetic path is generally high, which makes it impossible to obtain sufficiently high levels of reproducing output.

As has been explained, the prior art magnetic heads have the problem that the magnetic recording/reproducing characteristics are not fully improved when the track width is reduced. In particular, in the ring-type head in which the track width appears in the direction of the film thickness, the magnetic recording and reproducing characteristics are impaired and fluctuated due to difficulty encountered in setting the direction of easy magnetization perpendicular to the magnetic path.

SUMMARY OF THE INVENTION

Accordingly, an object of the present invention is to provide a magnetic head having superior recording and reproducing characteristics thereby overcoming the above-described problems of the prior art.

To this end, according to the invention, there is provided a magnetic head comprising, an operation gap, a magnetic path member which forms the operation gap, and coil means for generating a magnetic flux through the magnetic path member, the magnetic path member being composed of at least two members having different directions of easy magnetization.

According to one aspect of the present invention, there is provided a magnetic head comprising: a main magnetic path forming film for forming a main magnetic path and an operation gap and having a thickness not greater than 20 μm but not smaller than 1 μm; at least one auxiliary magnetic path forming film for forming an auxiliary magnetic path and having a thickness not smaller than 10 μm but not greater than 50 μm and magnetically coupled to said main magnetic path, and coil means magnetically coupled to at least one of the main and auxiliary magnetic path forming films and capable of conducting electromagnetic conversion. Thus, the construction, materials and magnetic properties of the magnetic head are determined such that disadvantages of the main magnetic path are compensated for by the auxiliary magnetic path.

The magnetic head according to this aspect of the invention is applied to a magnetic head having a track width smaller than that of the core width or height. In this case, the track width and the operation gap are formed by the main magnetic path forming film such that the direction of easy magnetization of the main magnetic film is formed perpendicular to the operation gap, while at least one of the auxiliary magnetic films has a direction of easy magnetization perpendicular to the rear magnetic path.

In particular, in the case of a ring-type head in which the track width appears in the direction of the thickness of the main magnetic path forming film, the magnetic anisotropy of the main magnetic path forming film is controlled in the region adjacent the operation gap so as to optimize the magnetic characteristics of the magnetic path, whereas the magnetic characteristics of the rear magnetic path are optimized through the control of the magnetic anisotropy of the auxiliary magnetic path forming film.

According to the invention, it is possible to optimize the magnetic characteristics of the magnetic path by virtue of the fact that the magnetic path member is composed of a plurality of members having different directions of easy magnetization.

The main magnetic path forming film serves to provide optimum magnetic characteristics in the region near the operation gap, whereas the auxiliary magnetic path forming film operates so as to provide optimum magnetic characteristics in the rear magnetic path, whereby superior magnetic characteristics are obtained in the magnetic path of a ring type magnetic head.

When the invention is applied to a magnetic head having a small track width, the auxiliary magnetic path serves to prevent reduction in the efficiency of the rear magnetic path, so that satisfactory head characteristics can be obtained even when the track width is reduced to 10 μm or below.

Furthermore, the recording performance is improved by use of a magnetic material having a high level of saturation of magnetic flux density, while the material of the auxiliary magnetic path forming film can be selected to provide a high magnetic permeability rather than the saturation magnetic flux density, whereby a magnetic head with a high recording density can be obtained.

DESCRIPTION OF THE PREFERRED EMBODIMENTS

Preferred embodiments of the present invention have the following features:

i) The magnetic head has a main magnetic path forming film which forms at least an operation gap, and at least one auxiliary magnetic path forming film which complements the main magnetic path forming film, the auxiliary magnetic path forming film being disposed behind the gap depth of the magnetic core and being magnetically coupled to the main magnetic path forming film.

ii) The auxiliary magnetic path forming film is provided on one or each side of the main magnetic path.

iii) At least one of the auxiliary magnetic path forming films has a direction of easy magnetization different from the direction of easy magnetization of the main magnetic path forming film. Preferably, the direction of easy magnetization of the main magnetic path forming film is perpendicular to the direction of the depth of the operation gap (i.e., it is in the direction of the running of the recording medium), and at least one of the auxiliary magnetic path forming films has a direction of easy magnetization that is at right angles to the above-mentioned direction of easy magnetization of the main magnetic path forming film.

iv) The main and auxiliary magnetic path forming films are made of a crystalline alloy such as an Ni-Fe alloy, Fe-Al-Si alloy or the like or an amorphous alloy film such as a Co-Ta-Zr alloy. It is also possible to use, as a material having a high saturation magnetic flux density, a multi-layer film of Fe-C/Ni-Fe alloy. The film is formed by RF sputtering, ion-beam sputtering, vacuum evaporation or other suitable thin-film forming techniques.

The main and auxiliary magnetic path forming films may be made of the same material or different materials may be used. Preferably, the main magnetic path forming member is made of a material having a high level of saturation magnetic flux density, while the auxiliary magnetic path forming film is made of a material which has a high magnetic permeability and which is reliable and easy to work.

A protective substrate on which these magnetic films are formed may be made of a crystallized glass such as Photoserum (registered trademark) of Corning Glass (USA), a rock salt type material such as MnO-NiO or NiO.MgO, or a non-magnetic material such as Zn ferrite, $Fe_2O_3$ or $ZrO_2$.

Examples of the magnetic head of the invention will be described with reference to the drawings.

EXAMPLE 1

Figure 1:
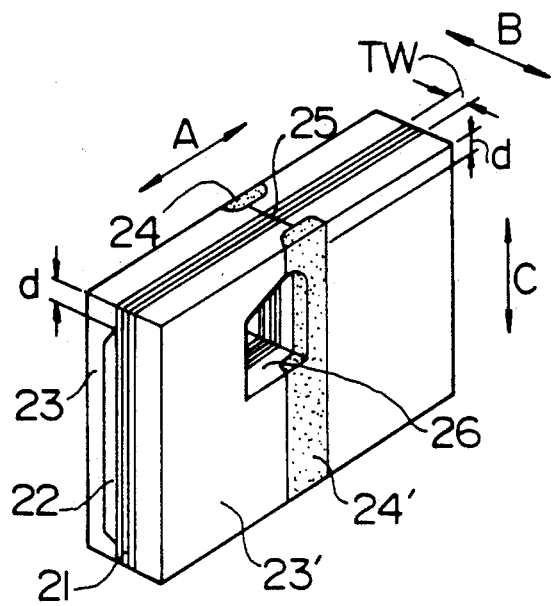
FIG. 1 is a perspective view of an embodiment of the magnetic head in accordance with the present invention.

FIG. 1 shows the construction of an example of the basic structure of an embodiment of the magnetic head in accordance with the present invention. This magnetic head is of a type having a ring-like magnetic path and composed of two parts each including two kinds of metallic magnetic layers 21, 22, substrates 23, 23' between which the metallic magnetic layers 21, 22 are sandwiched, the two parts being joined together by bonding glass layers 24, 24' across a gap 25.

The metallic magnetic layers 21 provide a main magnetic path with the track width Tw extending in the thicknesswise direction thereof, and an exposed to a surface of the magnetic head facing the recording medium. Each metallic magnetic layer 21 has a direction of easy magnetization coinciding with the direction A of the running of the head (perpendicular to the direction of the depth of the operation gap) so as to provide a high magnetic permeability in the direction opposing the recording medium, i.e., in the direction of the height of the head.

On the other hand, the metallic magnetic layer 22 provides an auxiliary magnetic path which is spaced downward by a distance equal to the gap depth d (5 to 30 μm) from the exposed surface of main magnetic path forming film 21 so as to serve to reduce the magnetic resistance of the rear magnetic path which is the portion of the magnetic path behind the gap depth d. Thus, the metallic magnetic layer 22 has a direction of easy magnetization coinciding with the direction C in which the head faces the recording medium so as to provide a magnetic permeability higher in value with respect to the rear magnetic path in the direction A of the running of the recording medium.

In this embodiment, the auxiliary magnetic path forming film is positioned below the gap depth d. According to this arrangement, the thickness of the main magnetic path forming film corresponding to the track width is maintained constantly down to the gap depth d so that the magnetic head can be used until the head is worn down to the depth d.

With these features, it is possible to enhance the efficiency of the magnetic path over the entire ring-type magnetic head and to obtain excellent magnetic head characteristics.

The metallic magnetic layers 21 can have a saturation magnetic flux density higher than that of the metallic magnetic layer 22 so that both metallic magnetic layers can play different roles, whereby a magnetic head having superior recording and reproducing characteristics can be obtained. In addition, the sliding noise can be suppressed because the whole magnetic path is formed of metallic magnetic members.

Figure 2:
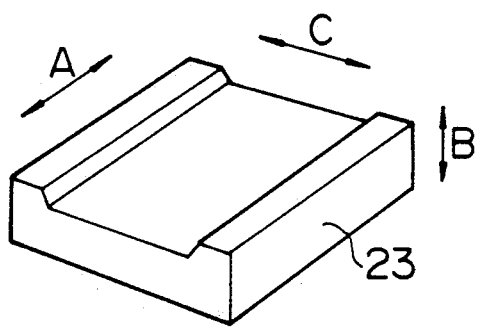
FIGS. 2 to 6 are illustrations of a process for producing a magnetic head of the present invention.

A description will be given of a process for producing this magnetic head, with reference to FIGS. 2 to 6. As the first step, a groove of about 50 μm is formed in one surface of substrate 23 of a rock salt type non-magnetic material of MnO.NiO, the groove extending in the direction A of running of the magnetic medium, as shown in FIG. 2.

Figure 3:
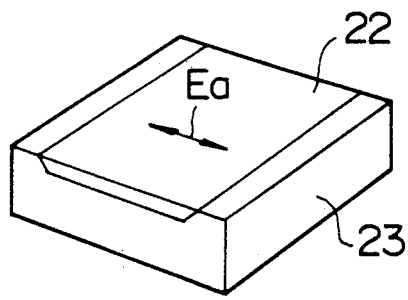

Subsequently, a sputtering is conducted to form a metallic magnetic layer 22 of 20 to 30 μm, which provides an auxiliary magnetic path, was formed in the groove as shown in FIG. 3, followed by a grinding and polishing step for removing the excessive part of the metallic magnetic layer so as to form a flat surface. In this example, an amorphous alloy $Co_{82}$-$Nb_{14}$-$Zr_4$ (at%) having a saturation magnetic flux density of 0.8T was used as the metallic magnetic layer 22. The magnetic layer 22 was formed in an argon gas atmosphere of 5 mm Torr by using an RF sputtering apparatus operated with an RF power of 250W. During the sputtering, a magnetic field of 100 Oe was applied or, after the sputtering, a heat treatment was conducted in which the metallic magnetic layer was held at 350° C. for 30 minutes in the presence of a magnetic field of 5 KOe, thereafter being cooled in the apparatus. The conditions of the magnetic field (etc.) used during the sputtering and the conditions of the heat treatment were such that the metallic magnetic layer thus formed had an easy magnetization direction Ea coinciding with the direction C in which the magnetic core faces the recording medium.

Figure 4:
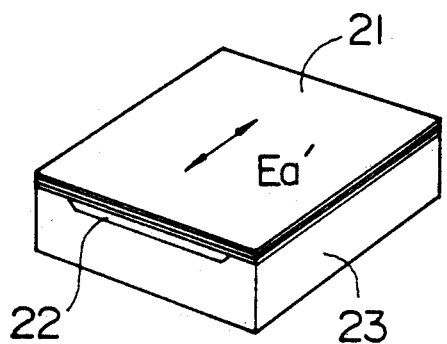

Subsequently, metallic magnetic layers 21 as a main magnetic path forming film were formed on the thus obtained substrate surface, as shown in FIG. 4. The thickness of this film was selected to be equal to the track width. A plurality of these layers were laminated with intermediaries of insulating layers of $SiO_2$ or the like material. This laminated structure is effective in reducing eddy current loss so as to improve the magnetic characteristics at high-frequency. In this example, an amorphous alloy $Co_{84}$-$Nb_{13}$-$Zr_3$ (at%) having a saturation magnetic flux density of 0.9T was used as the material of the metallic magnetic layers 21. Five such layers, each being 3 μm thick, were laminated through the intermediaries of $SiO_2$ insulating layers, so as to form the metallic magnetic film 21. This laminated film was formed by sputtering conducted under the influence of a magnetic field of 100 Oe so that the direction Ea' of easy magnetization of this film coincides with the direction of running of the magnetic medium or core. Thus, the main magnetic path forming film 21 has an easy magnetization direction coinciding with the direction of running of the magnetic core, and the direction of easy magnetization of the auxiliary magnetic path forming film is determined to be at about 90° or at right angles to the direction of easy magnetization of the main magnetic path forming film.

Figure 5:
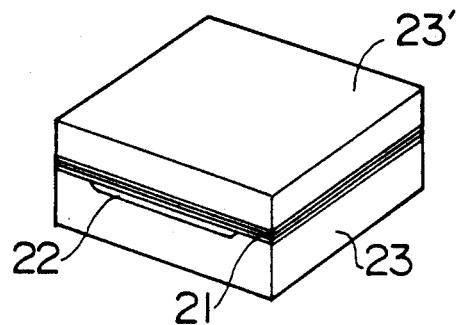

Subsequently, a substrate 23′ provided on its one side with a bonding glass layer was placed on the metallic magnetic film 21 as shown in FIG. 5, and the bonding glass was melted by the heat so that a joint block was obtained. A crystallized glass essentially containing PbO, $SiO_2$, $B_2O_3$, $Al_2O_3$ and ZnO and capable of being crystallized after heat-melting to exhibit a rise in the softening point was used as the bonding glass. The bonding temperature was 480° C.

Figure 6:
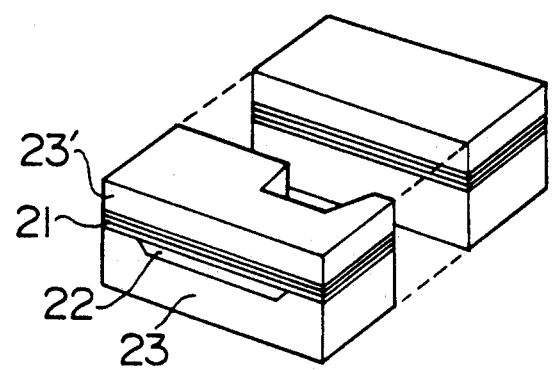

The block was then slitted as shown in FIG. 6 into a pair of core halves. A coil groove 26 was formed in one of the core half parts and, after polishing and smoothing of the gap faces, these two halves were bonded together through an $SiO_2$ non-magnetic thin film so as to form a gap length of 0.3 µm. The bonding was conducted by forming a recess outside the operation gap. Then, the recess was filled with a Pb type low-melting-point glass. The structure thus obtained was cut to a suitable core width, whereby a magnetic head core having a length of 2 mm, height of 1.5 mm and a width of 160 µm was obtained as shown in FIG. 1.

EXAMPLE 2

Figure 7:
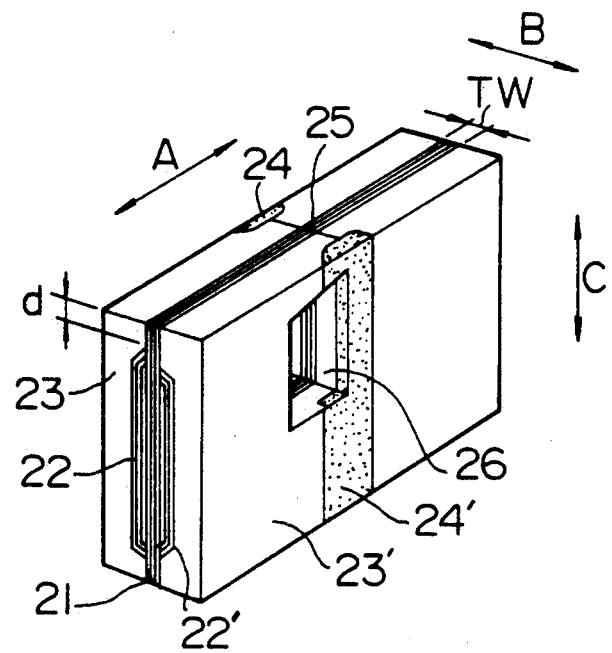
FIG. 7 is a perspective view of another embodiment of the magnetic head of the present invention.

Another example of the present invention will be described with reference to FIG. 7. The magnetic head of example is suitable for designs having a track width not greater than 10 µm but not smaller than 1 µm and that are capable of presenting a high density of recording. As shown in FIG. 7, this example of the magnetic head has metallic magnetic layers 21 for forming a main magnetic path and two kinds of metallic magnetic layers 22, 22′ for forming auxiliary magnetic paths.

The metallic magnetic layer 21 has an easy magnetization direction coinciding with the head running direction A (direction perpendicular to the direction of the depth of the gap). One of the two kinds of metallic magnetic layers 22, 22′ has the same direction of easy magnetization as the metallic magnetic layers 21 while the other has a direction of easy magnetization which is about 90° or at right angles to the direction of easy magnetization of the metallic magnetic layers 21.

This arrangement is adopted for the following reason. Namely, when the track width is reduced to 10 µm or below, the magnetic path formed only of the metallic magnetic layers 21 exhibits a drastic rise in magnetic resistance so that the recording and reproducing characteristics are impaired. This problem can be avoided by the use of a rear auxiliary magnetic path which has the same direction of easy magnetization as the metallic magnetic layers 21.

Figure 8A:
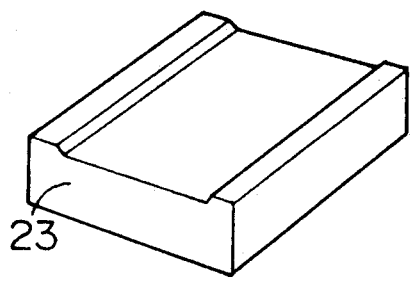
FIGS. 8A, 8B, 9A, 9B, 10, and 11 are illustrations of a process for producing the magnetic head shown in FIG. 7.
Figure 8B:
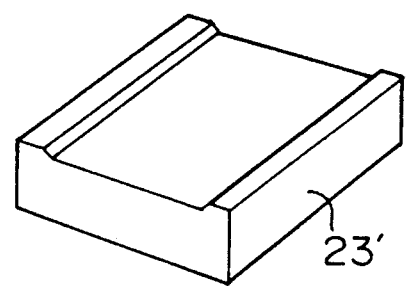

An example of a process for producing this magnetic head will be described with specific reference to FIGS. 8 to 9. This process is substantially the same as that explained before in connection with FIGS. 2 to 6.

As in the case of the process of Example 1, an MnO.NiO rock salt type non-magnetic material is used as a material of the substrate. In this example, a pair of substrates 23, 23′ are provided with grooves formed therein. The grooves are parallel to the direction A of the running of the magnetic core, i.e., perpendicular to the operation gap. The groove depth is 30 to 50 µm.

Figure 9A:
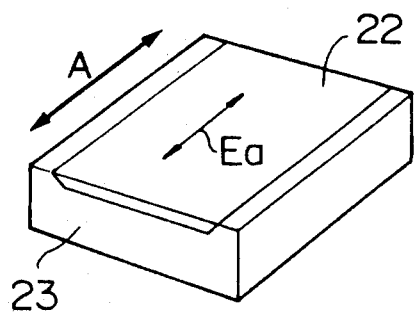
Figure 9B:
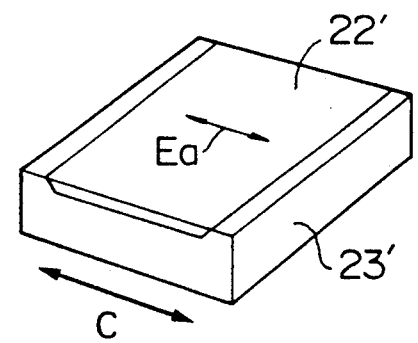

Subsequently, sputtering was conducted to form the metallic magnetic layers 22, 22′ which provide the auxiliary magnetic paths, followed by grinding and polishing so as to flatten the surface. In this example, an amorphous alloy $Co_{82}$-$Nb_{14}$-$Zr_4$ having a saturation magnetic flux density of 0.8T was used as the material of the metallic magnetic layers. The metallic magnetic layers were so formed that the metallic magnetic layers 22 have a direction of easy magnetization different from that of the metallic magnetic layer 22′. Namely, as shown in FIG. 9(a), the metallic magnetic layer 22 has a direction Ea of easy magnetization which is, as denoted by A, perpendicular to the operation gap of the magnetic core (parallel to the grooves in the substrates), whereas the direction Ea of easy magnetization of the metallic magnetic layer 22′ coincides with the direction C (direction perpendicular to the grooves in the substrates) in which the head opposes the recording medium, as shown in FIG. 9(b). The direction of easy magnetization was imparted by conducting a heat treatment in which the magnetic layers were held at 450° C. for 30 minutes in a magnetic field of 5 KOe followed by cooling in the apparatus. The metallic magnetic layer thus treated showed effective magnetic permeability values of 400 and 1500 in the direction of easy magnetization and in the direction of hard magnetization, respectively.

Figure 10:
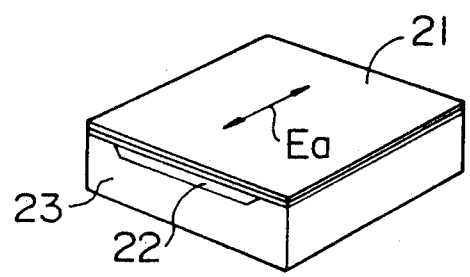

Subsequently, metallic magnetic layers 21 which provide the main magnetic path were formed on the substrate shown in FIG. 9(a), as shown in FIG. 10. In order to obtain a small width of the track head, the film thickness was determined to be 5 µm. The metallic magnetic layers 21 had a laminate structure composed of $Fe_{99}$-$C_1$ (at%)/$Ni_{90}$-$Fe_{10}$ (at%). The period of lamination was such that an $Ni_{90}$-$Fe_{10}$ layer of 5 nm was superposed on a $Fe_{99}$-$C_1$ layer of 0.1 µm and an insulating layer of BN of 10 nm thickness was placed for each 10 total layers of these two types of layers. This laminated film was formed by ion beam sputtering. The thus obtained laminate film showed a saturation magnetic flux density of about 2T, while the effective magnetic permeability in the direction of difficult magnetization was 2000 at 5 MHz. The use of a magnetic layer having such a high saturation magnetic flux density enables a recording medium having a high coercive force even when the track width is reduced. The magnetic anisotropy in the abovementioned multi-layered film was formed by causing sputtered particles to impinge obliquely upon the substrate. The detail of this technique and the conditions of forming the $Fe_{99}$-$C_1$/$Ni_{90}$-$Fe_{10}$ multi-layered film, as well as the magnetic properties of this film, are described in Japanese Unexamined Patent Publication No. 63-065604.

Figure 11:
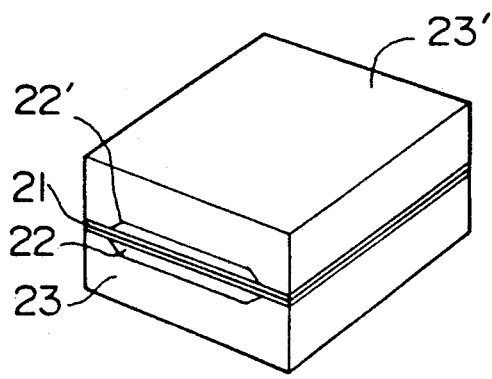
Figure 12:
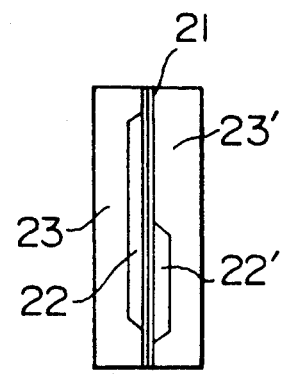
FIG. 12 shows a modification to the magnetic head of the embodiment of the invention shown in FIG. 7.

Subsequently, a bonding glass layer was formed on the surface of the metallic magnetic layer on the substrate 23′ and the substrate 23′ was superposed on the substrate 23 as shown in FIG. 11, followed by the heat-melting of the bonding glass, whereby a bonded block was obtained. The subsequent steps of this process are materially the same as those in the process explained before in connection with FIGS. 5 and 6. The widths of the grooves may be so determined that the magnetic layers 22, 22′ serving as auxiliary magnetic paths cover the entire side surface of the main magnetic path forming layers 21. The arrangement, however, may be such that the effect for reducing the magnetic resistance of the whole magnetic path is produced by the auxiliary magnetic path forming layer 22 having the same direction of easy magnetization as the main magnetic path forming layers 21, while the auxiliary magnetic path forming layer 22′ having the direction of easy magnetization perpendicular to that of the layers 21 was provided only in the rear part of the magnetic path, as shown in FIG. 12.

Preferably, each auxiliary magnetic path forming layer has a thickness ranging between 10 μm and 50 μm. The effect of the auxiliary magnetic path is reduced when the thickness is 10 μm or below. Superior high-frequency characteristics can be obtained even when the thickness is 50 μm or greater, provided that the multi-layered structure with insulating layers is employed. In this case, however, problems are encountered such as delamination of the film or prolongation of the film-forming time, making it difficult to mass-produce the magnetic head.

It was confirmed that the magnetic head of the invention having the above-described arrangement of the magnetic films can be satisfactorily used in recording and reproduction of information in a recording medium of a high coercive force up to 2000 Oe, even when the track width is reduced to a value not more than 5 μm but not less than 1 μm.

EXAMPLE 3

Figure 13:
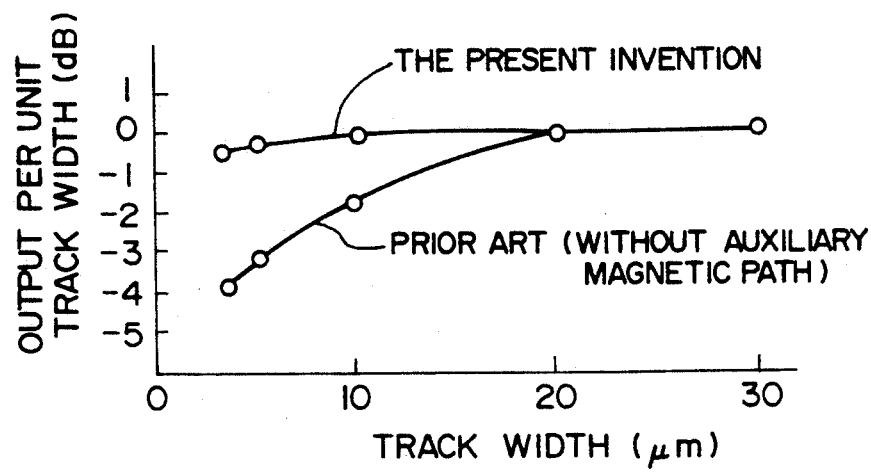
FIG. 13 is a graph showing the results of an experiment conducted to confirm the advantages of the present invention.
Figure 14A:
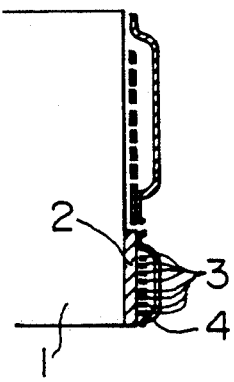
FIGS. 14a and 14b are a sectional view and a top plan view of a known thin-film type coiled magnetic head used in a known magnetic disk apparatus, respectively.
Figure 14B:
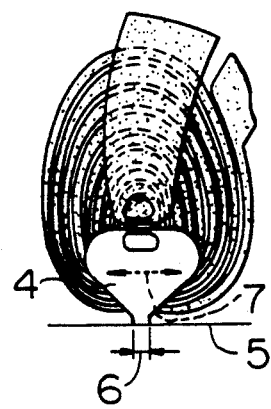
Figure 15:
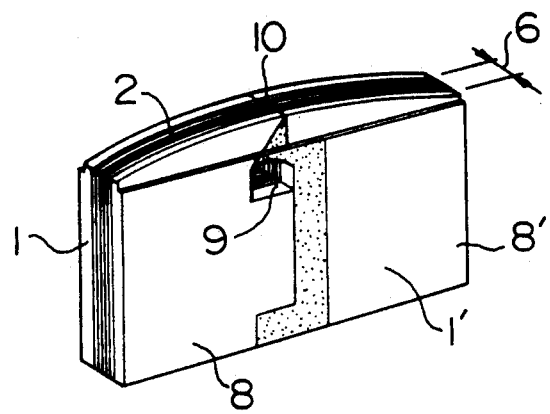
FIG. 15 is a perspective view of a known magnetic head used in a VTR.

A magnetic head of the present invention was formed from the same materials and under the same conditions as Example 1. Also formed was a comparison magnetic head of a conventional structure having no auxiliary magnetic path. These magnetic heads were tested on a VTR apparatus for recording and reproducing, and the values of reproducing output at 5 MHz per unit track width were measured. The relationships between the measured values of the output and the track width are shown in FIG. 13. The tape used in the measurement was a metal powder tape having a coercive force of 1500 Oe and was made to run at a relative velocity of 3.75 m/s. The gap length of the magnetic head was 0.3 μm, while the gap depth was 20 μm.

The conventional magnetic head devoid of the auxiliary magnetic path showed a drastic reduction in the reproduction output per unit track width, but the magnetic head of the present invention did not show any substantial reduction in the reproducing output level even when the track width is reduced to 5 μm or below.

The main magnetic path forming film and the auxiliary magnetic path forming film may be made of the same magnetic material, or the materials may be selected such that one of the main and auxiliary magnetic path forming layer is made of a polycrystalline film of an Fe-Al-Si alloy, Fe-Si alloy or an Fe-C alloy, while the other is formed of an amorphous film such as of a Co-Nb-Zr alloy, Co-Ta-Zr alloy or the like. For instance, the magnetic head shown in FIG. 1 may be composed of the auxiliary magnetic path forming layer 22 of an Fe-Al-Si alloy and a main magnetic path forming film 21 of a Co-Nb-Zr type amorphous alloy.

This combination of materials enables an easy control of the directions of easy magnetization of the main and auxiliary magnetic path forming layers 21 and 22. For instance, in a magnetic head production process shown in FIGS. 2 to 6, a 85 wt%Fe-6 wt%Al-9 wt%Si alloy film was formed as the auxiliary magnetic path forming film 22 as shown in FIG. 3. Subsequently, a heat-treatment was conducted in which the film was held for 30 minutes at 550° to 650° C. under the influence of a magnetic field of 5 KOe, followed by cooling in the apparatus, whereby a direction of easy magnetization was developed in the directions of arrows Ea. Subsequently, a Co-Nb-Zr amorphous alloy film was formed as the main magnetic path forming film 21 by sputtering. This film was then heat-treated by being held at 350° C. which is below the crystallization temperature for 30 minutes under the influence of a magnetic field of 5 KOe, followed by cooling in the apparatus, whereby a direction of easy magnetization was developed in the directions of the arrows Ea. This is because an amorphous alloy enables an easy control of the direction of easy magnetization by a heat treatment conducted in the production process under the influence of a magnetic field, in contrast to polycrystalline alloys which do not allow easy control of direction of easy magnetization once they are heat-treated. Therefore, when an amorphous alloy film is used as a part of the magnetic path, it is possible to control the direction of magnetization even in the bonding steps shown in FIGS. 5 and 6. However, when an amorphous alloy film is used, it is necessary that the heat-treatment is conducted at a temperature below the crystallization temperature and that the bonding glass has a low melting point.

On the other hand, when both the main magnetic path forming film and the auxiliary magnetic path forming film are made of a polycrystalline alloy, it is possible to use a bonding glass which has a high melting point and, hence, a high degree of reliability. Thus, the magnetic materials can be selected according to their intended use.

Another problem encountered with the magnetic head production process resides in that a reaction or a delamination tends to take place at the boundary between the substrate and the auxiliary magnetic path forming film or between the auxiliary magnetic path forming film and the main magnetic path forming film. The delamination is attributable to the difference in the thermal expansion coefficient and the internal stresses in the films. In order to avoid delamination, it is possible to form these films through intermediate layers or underlying layers according to their intended uses. The reaction can be suppressed by the use of a material which has a smaller tendency of reaction such as Cr, Ti, BN, SiC, $SiO_2$, $Al_2O_3$ or the like.

By employing an underlying layer or an intermediate layer between the adjacent constituent layers of the magnetic head, i.e., between the nonmagnetic substrate and the auxiliary magnetic path forming layer, between the auxiliary magnetic path forming layer and the main magnetic path forming layer, and between the main magnetic path forming layer and the other auxiliary magnetic path forming layer, it is possible to suppress reaction and delamination, thus making it possible to produce the magnetic head of the present invention with a high yield.

As has been described, the present invention offers the following advantages. Firstly, it is to be noted that both the main magnetic path forming film and the auxiliary magnetic path forming film play the roles of the respective magnetic paths of a ring-type magnetic head so that the efficiency of the magnetic path is increased to improve the characteristics of the magnetic head. When the magnetic head has a small track width, the auxiliary magnetic path serves to reduce the magnetic resistance at a rear part of the magnetic core so that the recording and reproducing characteristics at high frequencies are improved even when the recording density is high. A magnetic head according to the present invention is obtained which can satisfactorily perform recording and reproducing even with a very small track width of 5 μm or smaller. Furthermore, the wide selection of the materials of the main and auxiliary magnetic path forming films makes it possible to adapt the magnetic head of the present invention to a variety of types of magnetic recording apparatus. For instance, the magnetic head according to the present invention can suitably be used as a magnetic head of a digital VTR which is required to perform recording at high density and at high signal frequency, as well as a magnetic head of a digital VTR for high-quality TV known as high-vision. The magnetic head of the present invention can be used in a magnetic disk device for recording signals at high density, when combined with a suitable floating slider.

What is claimed is:

1. A magnetic head comprising: a main magnetic path forming film which forms an operation gap; and at least one auxiliary magnetic path forming film which complements said main magnetic path forming film, said auxiliary magnetic path forming film being disposed behind the gap depth of the magnetic core of said magnetic head and magnetically coupled to said main magnetic path forming film, said main magnetic path forming film having a direction of easy magnetization which is perpendicular to the depthwise direction of said operation gap, said auxiliary magnetic path forming film having a direction of easy magnetization which coincides with the direction in which said magnetic head opposes a recording medium.

2. A magnetic head according to claim 1, wherein said auxiliary magnetic path forming film is provided on each side of said main magnetic path forming film, one of the two auxiliary magnetic path forming films having the same direction of easy magnetization as said main magnetic path forming film.

3. A magnetic head according to claim 1, wherein said main magnetic path forming film has a saturation magnetic flux density greater than that of said auxiliary magnetic path forming film.

4. A magnetic head according to claim 1, wherein said main magnetic path forming film is made of an amorphous magnetic alloy, while said auxiliary magnetic path forming film is made of a polycrystalline magnetic alloy.

5. A magnetic head according to claim 1, wherein said main magnetic path forming film is made of a polycrystalline magnetic alloy, while said auxiliary magnetic path forming film is made of an amorphous magnetic alloy.

6. A magnetic head according to claim 1, wherein at least said auxiliary magnetic path forming film is embedded in a groove formed in a non-magnetic substrate.

7. A magnetic head according to claim 1, wherein each of said magnetic films forming said magnetic paths is a multilayered film having non-magnetic insulating layers.

8. A magnetic head according to claim 1, wherein the film thickness of said main magnetic path forming film provides the track width of 1 to 20 $\mu$m, said auxiliary magnetic path forming film having a thickness of 10 to 50 $\mu$m.

9. A magnetic head according to claim 1, wherein the film thickness of said main magnetic path forming film provides the track width of 1 to 10 $\mu$m, said auxiliary magnetic path forming film having a thickness of 10 to 50 $\mu$m.

10. A magnetic head according to claim 1, wherein a thin film of at least one material selected from the group consisting essentially of Cr, Ta, Ti, BN, SiC, SiO$_2$ and Al$_2$O$_3$ is provided between said non-magnetic substrate and said auxiliary magnetic path forming film, between said auxiliary magnetic path forming film and said main magnetic path forming film, and between said main magnetic path forming film and the other auxiliary magnetic path forming film.

11. A magnetic head according to claim 1, wherein said main magnetic path forming film has a saturation magnetic flux density greater than that of said auxiliary magnetic path forming film.

12. A magnetic head according to claim 11, wherein said main magnetic path forming film is a multi-layered film of Fe-C alloy or Fe-Si alloy, said auxiliary magnetic path forming film being made of an Fe-Al-Si alloy or an amorphous magnetic alloy.

13. A magnetic head having an operation gap with a track width, comprising: a main magnetic path forming film which forms a main magnetic path; and at least one auxiliary magnetic path forming film which forms an auxiliary magnetic path, said auxiliary magnetic path forming film being magnetically coupled with said main magnetic path forming film so as to improve the magnetic characteristics of said main magnetic path and said track width being defined only by said main magnetic path forming film, wherein said auxiliary magnetic path forming film is provided on each side of said main magnetic path forming film, one of the two auxiliary magnetic path forming films having a different direction of easy magnetization from that of said main magnetic path forming film.

14. A magnetic head according to claim 13, wherein said main magnetic path forming film is made of an amorphous magnetic alloy, while said auxiliary magnetic path forming film is made of a polycrystalline magnetic alloy.

15. A magnetic head according to claim 13, wherein said main magnetic path forming film is made of a polycrystalline magnetic alloy, while said auxiliary magnetic path forming film is made of an amorphous magnetic alloy.

16. A magnetic head according to 13, wherein at least said auxiliary magnetic path forming film is embedded in a groove formed in a non-magnetic substrate.

17. A magnetic head according to claim 16, wherein a thin film of at least one material selected from the group consisting essentially of Cr, Ta, Ti, BN, SiC, SiO$_2$ and Al$_2$O$_3$ is provided between said non-magnetic substrate and said auxiliary magnetic path forming film, between said auxiliary magnetic path forming film and said main magnetic path forming film, and between said main magnetic path forming film and the other auxiliary magnetic path forming film.

18. A magnetic head according to claim 13, wherein each of said magnetic films forming said magnetic paths is a multi-layered film having non-magnetic insulating layers.

19. A magnetic head according to claim 13, wherein the film thickness of said main magnetic path forming film provides the track width of 1 to 20 $\mu$m, said auxiliary magnetic path forming film having a thickness of 10 to 50 $\mu$m.

20. A magnet head according to claim 13, wherein the film thickness of said main magnetic path forming film provides the track width of 1 to 10 $\mu$m, said auxiliary magnetic path forming film having a thickness of 10 to 50 $\mu$m.

21. A magnetic head according to claim 13, wherein said main magnetic path forming film is made of an amorphous magnetic alloy, while said auxiliary magnetic path forming film is made of a polycrystalline magnetic alloy.

22. A magnetic head comprising: an operation gap have a track width, a magnetic path member forming said operation gap, and a coil means for generating a magnetic flux in said magnetic path member, said magnetic path member being composed of at least two magnetic path forming portions having different directions of easy magnetization wherein said track width is defined by only one of said portions.

23. A magnetic head according to claim 22, wherein said magnetic path forming portions comprise a main magnetic path forming portion as said one portion having a direction of easy magnetization perpendicular to the direction of depth of said operation gap, and at least one auxiliary magnetic path forming portion having another direction of each magnetization different from that of said main magnetic path forming portion.

24. A magnetic head according to claim 23, wherein said magnetic path member includes at least one magnetic layer the thickness of which provides the track width of said operation gap.

25. A magnetic head according to claim 23, wherein said at least one auxiliary magnetic path forming portion has a direction of easy magnetization which coincides with the direction of depth of said operation gap.

26. A magnetic head according to claim 25, wherein said magnetic path member includes at least one magnetic layer the thickness of which provides the track width of said operation gap.

27. A magnetic head according to claim 22, wherein said main magnetic path member includes at least two magnetic layers, the combined thicknesses of which provide the track width of said operation gap.

28. A magnetic head comprising an operation gap having a track width opposing a recording medium, and a magnetic path member for causing a magnetic flux to pass through said operation gap so that signals are magnetically recorded by the magnetic flux from said operation gap in said recording medium which moves relative to said magnetic head, said magnetic path member being provided with a main magnetic path portion forming said operation gap and at least one auxiliary magnetic path portion magnetically coupled to said main magnetic path portion wherein said track width is defined only by said main magnetic path portion, said main magnetic path portion having a greater magnetic permeability in the direction perpendicular to the plane of said recording medium than in other directions, and said auxiliary magnetic path portion having a greater magnetic permeability in the direction of movement of said recording medium than in other directions.

29. A magnetic head according claim 28, wherein said main magnetic path portion is formed by laminating a plurality of layers.

30. A magnetic head according to claim 28, wherein a thickness of said main magnetic path portion is made to provide the track width of said magnetic head.

31. A magnetic head according to claim 30, wherein said main magnetic path portion is formed by laminating a plurality of layers.

32. A magnetic head according to claim 28, wherein said auxiliary magnetic path portion is spaced downward from a surface exposed to the recording medium by a distance substantially equivalent to a depth of said operation gap.

33. A magnetic head according to claim 28, wherein said at least one auxiliary magnetic path portion comprises two magnetic path portions wherein one of said auxiliary magnetic path portions has a greater magnetic permeability in the direction of movement of the recording medium than in other directions and the other of said auxiliary magnetic path portions has a greater magnetic permeability in the direction perpendicular to the plane of the recording medium than in other directions.

34. A magnetic head according to claim 33, wherein said one auxiliary magnetic path portion is provided only in a rear part of the auxiliary magnetic path.

* * * * *